United States Patent [19]

Godfrey

[11] 4,214,760
[45] Jul. 29, 1980

[54] SEAL FOR ADJACENT PLATES

[76] Inventor: Dwaine A. Godfrey, 210 Brandon Pl., N.W., Atlanta, Ga. 30328

[21] Appl. No.: 965,952

[22] Filed: Dec. 4, 1978

[51] Int. Cl.² ............................................. F16J 15/46
[52] U.S. Cl. .................................... 277/34.3; 138/89
[58] Field of Search ...................... 277/34.3, 34.6, 34, 277/226; 138/89, 92, 93

[56] References Cited

U.S. PATENT DOCUMENTS

| | | | |
|---|---|---|---|
| 2,306,990 | 12/1942 | Essl . | |
| 2,648,554 | 8/1953 | Gilbert | 277/34.3 |
| 2,825,941 | 3/1958 | Lux et al. | 277/34.3 |
| 3,040,393 | 6/1962 | Dailey . | |
| 3,284,955 | 11/1966 | Schroth . | |
| 3,397,490 | 8/1968 | Carlson . | |
| 3,501,868 | 3/1970 | Ganzinotti . | |
| 3,717,352 | 2/1973 | Jansing et al. | 277/34.3 |
| 3,984,942 | 10/1976 | Schroth . | |
| 4,045,035 | 8/1977 | LeCorvier | 277/34.3 |
| 4,073,048 | 2/1978 | Ditcher . | |

FOREIGN PATENT DOCUMENTS 1082567  9/1967  United Kingdom ..................... 277/34.3

OTHER PUBLICATIONS

Pneuma-Seal Inflatable Seal, Copyright 1976, Presray Corp.-Pneuma-Seal, Nuclear News, Sep. 1978, p. 76.

Primary Examiner—Robert I. Smith
Attorney, Agent, or Firm—Lombro J. Ristas

[57] ABSTRACT

An arrangement for temporarily sealing the space between two substantially parallel, adjacent plates in which a flexible, partially inflatable seal is located between the plates to effect primary and secondary sealing interfaces along the upper and lower edges of the plates, respectively. The seal has a wedged-shaped upper portion, a tubular lower portion and a substantially solid intermediate shank. The tubular end of the seal is inflated so that it expands into contact with the lower edges of the plates, drawing the wedge-shaped upper portion of the seal toward the tubular portion, thereby forming primary sealing interfaces between the wedged-shaped portion and the upper edges of the plates. The contact of the inflated tubular portion with the lower edges of the plates forms secondary seal interfaces. The effectiveness of the seal can be tested by measuring the pressure in the chambers formed between each set of primary and secondary sealing interfaces.

21 Claims, 4 Drawing Figures

SEAL FOR ADJACENT PLATES

BACKGROUND OF THE INVENTION

This invention generally relates to sealing the space between adjacent plates or ledges and in particular to providing a temporary seal for supporting liquid above the plates.

The conditions giving rise to the problems solved by the present invention are commonly found in nuclear reactor power plants. In particular, the refueling process in pressurized water reactors must be performed under approximately 25 feet of water in a refueling canal above the reactor vessel, while the reactor vessel cavity under the canal must remain dry. During normal power operation the refueling canal is dry and, with the vessel cavity, forms a single large enclosure. The seal between the refueling canal and the vessel cavity cannot be present during normal operation, only during refueling.

Typically a portion of the floor of the refueling canal forms a ledge opposite a flange attached to the upper portion of the reactor vessel. The ledge and flange provide sealing surfaces on which prior art canal sealing interfaces were effected. Prior art seals typically consist of a ring plate having an outside diameter of about 25 feet and a width of from 1 to 3 feet. Compression seals carried on the underside of the ring plate rest on the flange and ledge. The ring plate is bolted down to compress the seals and form a water-tight fit.

Several problems exist with these kind of seals. First, the lower surface of the plate must be machined during shop fabrication, a costly operation for such a large structure, in order to assure proper compressive sealing throughout the circumference of the plate. This need for a nearly perfectly flat lower surface precludes assembly of the plate in the field, so that a large, cumbersome structure must be shipped from the shop to the site. Moreover, the plate must arrive on sight before the containment building is erected because the plate is too large to pass through the containment penetrations. This results in the plate being kept near its final storage area while the containment building is erected around it, inconveniencing workers who have not yet completed the interior structure in the vicinity of the storage area. Another problem with such prior art seals is that after a few years of plant operation, the flange and ledge tend to shift from the as-built locations due to thermal expansion, building settling, etc. Additional threaded penetrations for the compression bolts must be drilled. This not only delays refueling operations but adds to the radiation exposure of the work crews who already experience significant radiation during the tightening of the many bolts between the plate and the ledge and flange. A modification to the prior art seal eliminates the compression seals and bolts at the flange surface by substituting an inflatable seal interacting between the outer surface of the flange and a backing ring on the underside of the plate.

Even with these improvements, safety and licensing considerations require the capability to test the seals before water is introduced into the refueling canal. Typically, a separate set of seals is provided adjacent to the primary seals so that the air pressure in the space between the primary and secondary seals can be measured as an indication of the effectiveness of the seals. The separate seals present the same design and fabrication problems as the prior art primary seals.

SUMMARY OF THE INVENTION

One object of the invention is to provide a seal which, when located between adjacent wall means, provides both primary and secondary sealing interfaces.

Another object is to permit simple testing of the effectiveness of such seals.

Another object is to provide temporary sealing interfaces between spaced apart, adjacent plates, ledges or flanges which do not require any carefully machined sealing surfaces.

A further object is to provide a seal plug arrangement for a refueling canal which can be field assembled and which greatly reduces the radiation exposure to workmen installing this seal plug.

According to one aspect of the invention, there is provided a sealing arrangement comprising a first plate or wall having first and second parallel edges and a second wall in adjacent closely spaced parallel relationship to the first wall and having first and second edges substantially opposite the first and second edges of the first wall. A flexible seal is disposed in the space between the first and second walls, the seal having an enlarged tapered first end and an inflatable, tubular second end. The first end is in contact with and extends outwardly beyond the first edges of the first and second walls. The tube is adjacent to and extends outward beyond the second edges of the first and second walls. Valve means are provided in the seal for inflating the tubular end whereby the tube expands into contact with the second edges of the first and second walls thereby forming a secondary sealing interface and drawing the first end of the seal inward toward the space between the walls to form a primary sealing interface along the first edges of the walls.

According to another aspect of the invention, there is provided an apparatus for plugging the space between first and second substantially parallel flanges to form a portion of a cavity floor to be filled with liquid. The apparatus comprises a plug including a plate to be located between the first and second flanges having a width less than the distance between the flanges, and two flexible seals, one between the plate and the first flange and the other between the plate and the second flange. Each seal has a substantially solid enlarged first end, a substantially solid elongated shank, and an inflatable tubular second end. The seals are preferably carried by the plug and spaced adjacent to the ends of the plate such that when the plug is located between the flanges the enlarged portion of each seal contacts the plate and the respective opposing flange, and the tubular end extends below the lower edges of the plate and opposing flange.

BRIEF DESCRIPTION OF THE DRAWINGS

Other objects and advantages of the invention will be evident from the description accompanying the drawings in which.

DESCRIPTION OF THE PREFERRED EMBODIMENT

Figure 1:
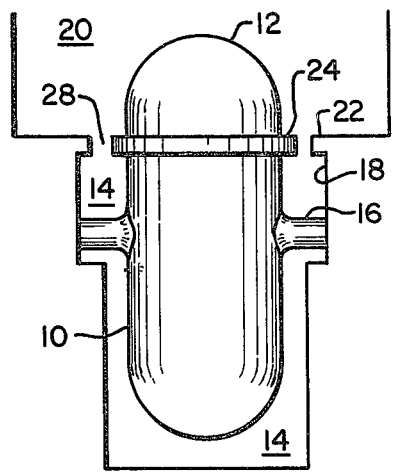
FIG. 1 is an elevation view of the reactor vessel located in the reactor vessel cavity and refueling canal.

FIG. 1 shows the environment in which the preferred embodiment of the invention is used. A reactor vessel 10 having a vessel head 12 is located in a reactor vessel cavity 14 and suspended therein by the vessel nozzles 16 which find their support within the cavity walls 18. Above the reactor vessel 10 the cavity walls 18 define a refueling canal 20 having a lower boundary defining a refueling canal ledge 22 generally opposite the vessel flange 24 which is welded to the vessel 10.

Refueling of the reactor generally occurs annually and consists of filling the refueling canal 20 with water, then removing the vessel head 12 from the vessel 10 so that access may be had to the nuclear fuel (not shown) inside the vessel 10. It is imperative, however, that none of the water in the refueling canal 20 leak into the vessel cavity 14 because refueling water would create contamination problems with the vessel 10 and other equipment in the vessel cavity 14. The annular space 28 between the vessel flange 24 and the cavity ledge 22 cannot be sealed during plant operation because of safety and licensing requirements relating to hypothetical accidents which must be accommodated without damage to any components. In particular, if a vessel nozzle 16 breaks, the flashing liquid must have an escape route from the vessel cavity 14 in order to prevent excessive uplift on the vessel 10 which could further complicate an already serious accident. Therefore, the space 28 must be maintained during normal operations to permit a steam flow path out of the vessel cavity 14. The space 28 may be sealed only during the reactor refueling operation.

Figure 3:
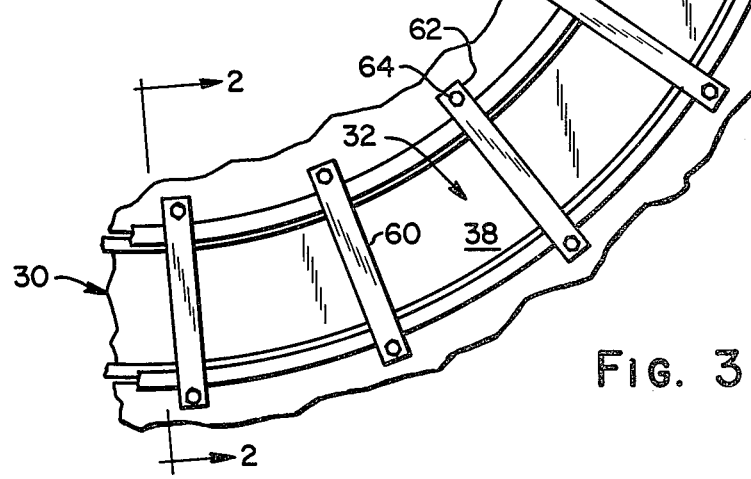
FIG. 3 is a plan view of the invention in place between the reactor vessel flange and the refueling canal ledge.
Figure 2:
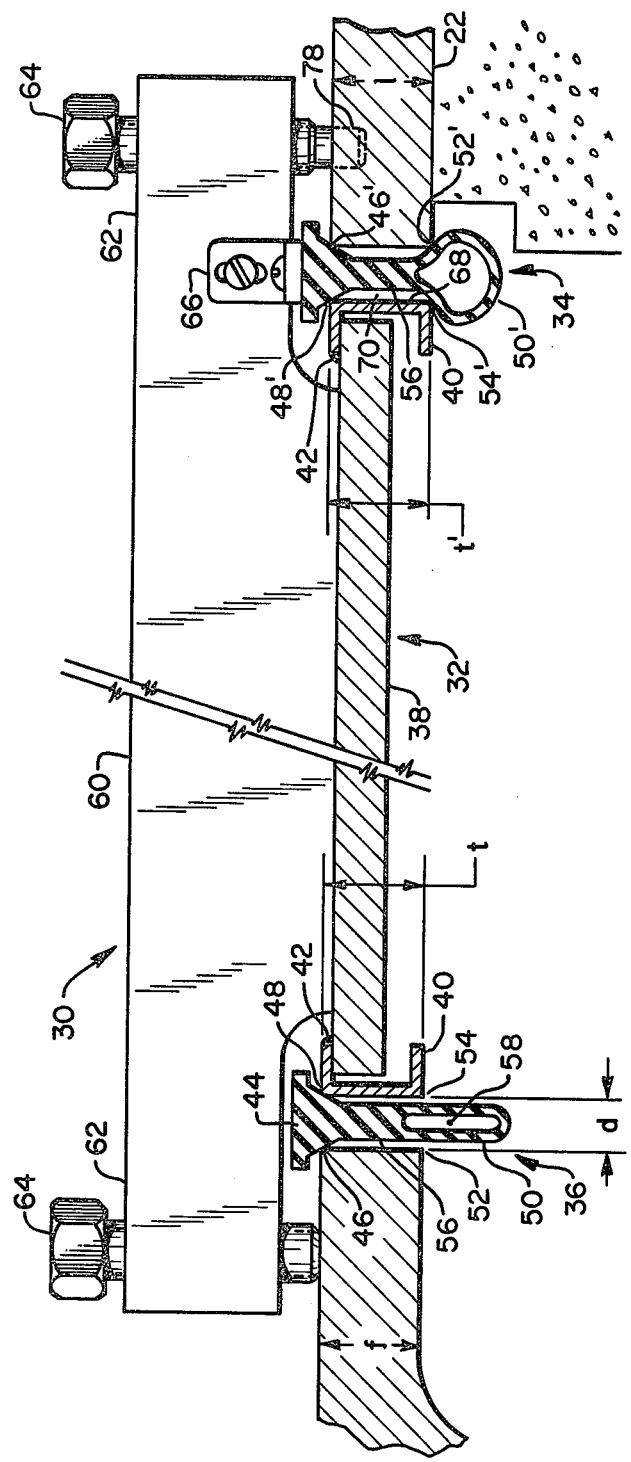
FIG. 2 is a detailed elevation view of the invention as implemented between the reactor vessel flange and the refueling canal ledge, taken along line 2—2 of FIG. 3.

FIGS. 2 and 3 show the preferred embodiment of the invention in place between the vessel flange 24 and the canal ledge 22. In this embodiment of the invention, a plug 30 having a seal ring 32 is located between the flange 24 and ledge 22 and carries ledge seal 34 and flange seal 36. The seal ring 32 typically has an outer diameter of about 25 feet and a width of approximately 1 to 3 feet. It can be appreciated that such a large steel structure is difficult to fabricate to close tolerances and that a great expense will be incurred if one or more horizontal surfaces of the ring must be carefully machined. As will be described below, the present invention does not require special machining of the ring 32. The primary requirement imposed on the ring 32 is that the ring effective thicknesses t, t' at the inner and outer edges be substantially equal to the thickness f of the opposing vessel flange and l of the cavity ledge, respectively. In the preferred embodiment the thickness of the steel ring plate 38 of the seal ring 32 is substantially less than the thicknesses f and l in order to save on the cost of materials. The plate 38 has C-channels 40 attached to the outer and inner edges, the channels having edges opposing the flange 24 and ledge 22 and separated therefrom by a distance d. These channels 40 are welded to the plate 38 around its entire inner and outer radii, the weldment 42 serving primarily to form a seal between the channels 40 and plate 38 rather than supplying great structural strength. The plate 38 and channels 40 together form the seal ring 32 in this embodiment.

Figure 4:
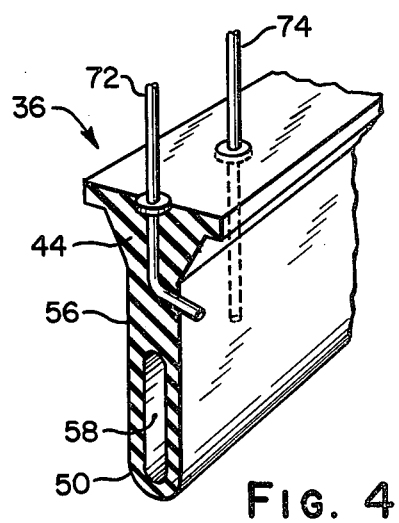
FIG. 4 is a cut-away view of the flexible seal showing the air tap and the test probe.

Referring now to FIGS. 2 and 4, the flexible seal 36 between the ring 32 and the flange 24 is shown in the initial, or relaxed state as it would appear upon insertion of the plug 30 between the flange 24 and ledge 22. The flexible seal 34 between the ring 32 and the ledge 22 is identical in this embodiment but shown in the inflated, or sealing state. The seal 36 has an enlarged, tapered upper end 44 which extends above the flange upper edge 46 and ring upper edge 48 for reasons to be explained below. The lower end 50 of the seal 36 is tubular and extends below the flange lower edge 52 and ring lower edge 54. Each seal 36 has a substantially solid elongated shank portion 56. This shank 56 permits the geometric center 58, or longitudinal axis, of the tubular portion 50 to be below the imaginary plane formed by connecting the flange lower edge 52 to the ring lower edge 54, without requiring the tubular portion 50 of the seal 36 to be excessively elongated. In addition, the shank 56 also serves as one fairly rigid boundary of a naturally formed chamber used for testing the effectiveness of the seal, as explained below.

After the seal 36 is in place as shown at left in FIG. 2, the tubular portion 50 is inflated until the seal deforms into the configuration shown as seal 34 in FIG. 2. As the seal expands between the configurations shown as the flange seal 36 and the ledge seal 34, the walls of the tubular portion 50 come into contact with ring lower edge 54 and flange lower edge 52. As the tube 50 continues to expand, a downward force is transmitted through the shank 56 onto the wedge portion 44, drawing the wedge 44 inward toward the space between the ring 32 and flange 24. Inflation is stopped when the tube reaches an internal pressure in the range typically between 25 to 100 psi depending on the dimensions t and d, and the size of the seal. If the geometric center 58 of the tubular portion 50 is too close to the wedge portion 44, the drawing-down action of the tube pressing against the lower edges 52 and 54 may be diminished, so that a satisfactory sealing interface will not be obtained.

In the preferred embodiment, the ledge seal 34 and flange seal 36 are carried on the plug 30 by means of slotted L-brackets 66, shown here only attached to the ledge seal 34 but it is to be understood that every seal 34, 36 is likewise attached to a support arm 60. The bracket 66 maintains the seals in a fixed lateral position relative to the ring 32 to facilitate installation but permits seal motion transverse to the plate. Such freedom in the transverse direction is necessary to permit the wedge portion 44 of the seals to be drawn into the space to be sealed during inflation of the tubular portion 50.

Before the refueling canal 20 can be filled with water, the seal effectiveness must be tested. The inflated seals 34, 36 provide convenient test chambers between the wedge portion 44 and the tubular portion 50. The wedge 44 is a passive seal that provides the primary sealing interface protection against the head of water in the refueling canal. The tubular portion 50 provides a secondary, active sealing interface which will continue to function even if a leak occurs in the wedge sealing interface. The primary and secondary sealing interfaces at 48', 54' the shank 56 and the channel wall 68 define the test chamber 70 into which a test probe can be introduced. Each inflated seal 34, 36 forms two test chambers. In the preferred embodiment, the test probe 72 is carried by the flexible seals as shown in FIG. 4. Several probes 72 can be located along the length of the seals 34, 36 alternately facing inward and outward. FIG. 4 also shows the conventional air tap 74 through which air is introduced into the tubular portion 50 of the seal for activating the seal.

Inflatable flexible seals having a different shape from that described above have been commercially available from the Presray Corporation of Pawling, N.Y. One type is, for example, generally described in U.S. Pat. No. 3,984,942 issued to R. A. Schroth. In particular, the method of fabricating the flexible seal with the air tap 74 and test probe 72 as shown in FIG. 4 is known and does not form a part of this invention. The preferred seal material is fabric reinforced elastomer. It is to be understood that other, conventional devices for testing the pressure chamber 70 may be used instead of the probe 72 shown in FIG. 4.

Referring again to FIGS. 2 and 3 it can be appreciated that plug 30 as described above can weigh 10,000 pounds or more and that handling such a structure could pose significant problems to a work crew. In the preferred embodiment of the invention, the plug 30 includes several ring supports 60 distributed around the ring 32. The ring supports 60 provide members which can be grasped by the overhead crane (not shown) in the containment for positioning the plug 30 between the flange 24 and ledge 22. As shown in FIG. 2, the plate supports 60 are also adapted to aid in positioning and supporting the ring 32 with respect to the flange 24 and ledge 22 such that the edges 46 and 48, 52 and 54, 46' and 48', 52' and 54' are respectively opposite as required for proper sealing. Support arms 62 are cantilevered from the ring 32 so as to overhang the flange 24 and ledge 22. Leveling bolts 64 are threaded through the arm 62 and interact with the upper surfaces of the flange 24 and ledge 22 whereby the ring 32 can be vertically oriented with respect thereto. The bolts 64 need not be threaded into the flange 24 or ledge 22 since only holes 78 in the ledge 22 are needed to laterally and rotationally orient the plug 30. Therefore much installation time is saved relative to the prior art seals, which required careful bolting. The first refueling operation may require several leveling bolt adjustments before the ring 32 is flush with the flange 24 and ledge 22, but thereafter only minor adjustments should be necessary. It is a simple matter to check whether the ring 32 is in proper position because, as shown in FIG. 3, most of the ring 32 and flexible seals 34, 36 are exposed for inspection.

Since the plate 38 does not serve as a sealing surface for the flexible seals 34, 36 the plug 30 may be manufactured in as many segments as desired, and fabricated at the site. Machining on a large boring mill is not required. The plate segments can be butt welded at the site. The tolerances for this butt weld are rather loose and only good fabrication practices are required. The most important dimensions are the inner diameter and outer diameter of the channels 40. By allowing excess plate at the ends of each segment for field trimming the radii of the plate 38 can be controlled without any difficulties.

After the refueling operation has been completed the plug 30 may be removed by simply deflating the seals 34, 36 and pulling upward on the plug support arm 60 to remove the entire plug assembly including seals from the space between the flange 24 and the ledge 22. It may be appreciated that such a simple removal operation minimizes the exposure of the workmen to radiation and in particular does not require the unbolting of the plug 30 from the flange 24 or ledge 22.

Although only the preferred embodiment of the invention has been described, it is evident that the invention will find uses other than in the sealing of nuclear reactor refueling canals. For example, the invention is useful for effecting a seal between two adjacent plates having substantially parallel, opposed edges. Thus, it is not necessary that the plate be sealed on both sides in order to practice the invention.

What is claimed is:

1. In combination, the sealing arrangement comprising:
   a first plate having first and second parallel edges;
   a second plate in adjacent closely spaced parallel relationship to the first plate having first and second edges substantially opposite the first and second edges of the first plate;
   a flexible seal disposed in the space between the first and second plates having enlarged tapered first end and an inflatable, tubular second end, the first end being in contact with and extending outward beyond the first edges of the first and second plates and the second end being adjacent to and extending outward beyond the second edges of the first and second plates; and
   valve means in the seal for inflating the second end of the seal whereby the tube expands into contact with the second edges of the first and second plates thereby forming secondary sealing interfaces and drawing the first end of the seal inward toward the space between the first and second plates to form primary sealing interfaces.

2. The arrangement of claim 1 wherein the longitudinal axis of the tubular end of said seal prior to inflation is beyond the second edges of said first and second plates.

3. The arrangement of claim 2 wherein the enlarged tapered portion of said seal is solid.

4. The arrangement of claims 2 or 3 further including means located between said first and second plates for testing the pressure in one of the chambers formed between said seal and one of said plates.

5. The arrangement of claim 2 wherein said seal has an elongated substantially solid shank portion intermediate the first and second ends of said seal.

6. The arrangement of claims 1 or 5 wherein said second plate includes channel means defining the first and second edges of said second plate.

7. The arrangement of claim 5 further including means located between said first and second plate substantially opposite said shank for testing the pressure in the chamber formed between the primary and secondary sealing surfaces.

8. In combination, an arrangement for sealing a first flange to an opposite substantially parallel second flange against liquid pressure exerted transversely from above the flanges, comprising:
   a plate located between and substantially parallel to the first and second flanges, each end of said plate being spaced apart from the respective opposite flange and having upper and lower edges opposite the upper and lower edges of the respective opposite flange;
   flexible seals one between said plate and the first flange and the other between said plate and the second flange, each seal having a substantially solid, enlarged, tapered first end and an inflatable, tubular second end, the first end of said seals being in contact with and extending above the upper edges of one end of said plate and respective flange, and the second end of said seals being adjacent to and extending below the lower edges of one end of said plate and respective flange; and valve means in each of said seals for inflating the second end whereby the tube may be expanded into contact with the opposite lower edges of said plate and said first and second flanges respectively to form secondary sealing interfaces and to draw the tapered portion of said seal inward toward the space between said plate and said first and second flanges to form primary sealing interfaces therebetween.

9. The arrangement of claim 8, wherein the longitudinal axis of the tubular ends of each of said seals prior to inflation is below the lower edges of said respective plate and flange.

10. The arrangement of claim 9, wherein each of said seals has an elongated substantially solid shank portion intermediate the tapered and tube ends.

11. The arrangement of claim 10, wherein said plate includes channel means which define the upper and lower edges of said plate for contacting said seals.

12. The arrangement of claim 8, further includes means fixedly attached to said plate for adjusting the orientation of said plate relative to said flanges.

13. The arrangement of claim 12, wherein said orientation means includes cantilevered arms extending above each of said flanges, said arms having leveling means for interacting with the upper surface of each of said flanges.

14. The arrangement of claim 13, wherein said adjusting means includes means for carrying each seal, said carrying means permitting transverse movement of said seal relative to said plate.

15. An apparatus for plugging the annular space between first and second substantially parallel flanges to form a portion of a cavity floor to be filled with liquid, said flanges being separated by a known distance, comprising:

a plug including a plate having a width less than said known distance and adapted to be located between and parallel to said flanges; and flexible seals, each having a wedge-shaped upper portion, an inflatable tubular lower portion, and a substantially solid elongated shank portion, said seals being carried by said plug and horizontally spaced adjacent the ends of said plug such that when said plug is located between said flanges, the upper portion of said seals contact said plate and the respective opposing flange.

16. The apparatus of claim 15, wherein the thickness between the upper and lower edges of the first end of said plate is the same as the thickness of said first flange, and the thickness between the upper and lower end of the second end of said plate is the same as the thickness of said second flange.

17. The apparatus of claim 16, wherein the longitudinal axis of the tubular end of each of said seals prior to inflation is below the lower edge of the respective end of said adjacent plate.

18. The apparatus of claim 17, wherein said plate includes channel means defining the upper and lower edges of said plate.

19. The apparatus of claim 18, wherein said plug includes means attached to said plate for adjusting the orientation of said plate relative to said flanges.

20. The apparatus of claim 19, wherein said orientation means include cantilevered arms extending above each of said flanges, said arms having leveling means for interacting with the upper surface of each of said flanges.

21. The apparatus of claim 20, wherein said adjusting means includes means for carrying each seal, said carrying means permitting transverse movement of said seal relative to said plate.

* * * * *